US010399085B2

(12) United States Patent
Müller et al.

(10) Patent No.: US 10,399,085 B2
(45) Date of Patent: Sep. 3, 2019

(54) METHOD AND APPARATUS FOR DECOMPOSING A RECYCLATE

(71) Applicants: Tim Müller, Ottendorf-Okrilla (DE); Leonid Gelfond, Dresden (DE); Stefan Eisert, Wehrsdorf (DE)

(72) Inventors: Tim Müller, Ottendorf-Okrilla (DE); Leonid Gelfond, Dresden (DE); Stefan Eisert, Wehrsdorf (DE)

(73) Assignee: ImpulsTec GmbH, Dresden (DE)

( * ) Notice: Subject to any disclaimer, the term of this patent is extended or adjusted under 35 U.S.C. 154(b) by 1177 days.

(21) Appl. No.: 14/354,497

(22) PCT Filed: Sep. 20, 2012

(86) PCT No.: PCT/EP2012/003913
§ 371 (c)(1),
(2) Date: Apr. 25, 2014

(87) PCT Pub. No.: WO2013/060403
PCT Pub. Date: May 2, 2013

(65) Prior Publication Data
US 2014/0326809 A1 Nov. 6, 2014

(51) Int. Cl.
*B02C 19/00* (2006.01)
*B02C 19/18* (2006.01)
*B09B 3/00* (2006.01)

(52) U.S. Cl.
CPC .............. *B02C 19/18* (2013.01); *B09B 3/00* (2013.01); *B02C 2019/183* (2013.01)

(58) Field of Classification Search
CPC ..... B02C 19/18; B02C 2019/183; B08B 3/00; A61K 9/0009; B01F 3/1235; B01F 11/02; B01F 11/0266

(Continued)

(56) References Cited

U.S. PATENT DOCUMENTS 3,604,641 A 9/1971 Wilson et al.
5,758,831 A * 6/1998 Collins .................. B02C 19/18
241/1

(Continued)

FOREIGN PATENT DOCUMENTS

DE          195 34 232 A1    3/1997
DE     10 2006 027 273 B3    10/2007

(Continued)

OTHER PUBLICATIONS

DE19534232A1 English Translation.*

(Continued)

*Primary Examiner* — Faye Francis
(74) *Attorney, Agent, or Firm* — Muncy, Geissler, Olds & Lowe, P.C.

(57) ABSTRACT

The invention relates to a method and a device for disintegrating a recyclable item in a material-selective manner and using the electrohydraulic effect, an electric discharge being generated, in a container filled with a liquid, using a pulsed current source and within an underwater spark gab between a container base-side electrode and at least one container cover-side electrode that points towards the first electrode, with electric discharge having an average field strength of less than or equal to 5 kV/mm and a pulse or discharge energy of greater than 10 J, and being generated at least substantially in the liquid. In the container, the recyclable item lies partially in the underwater spark gab on the container base-side.

18 Claims, 3 Drawing Sheets

Figure 1:
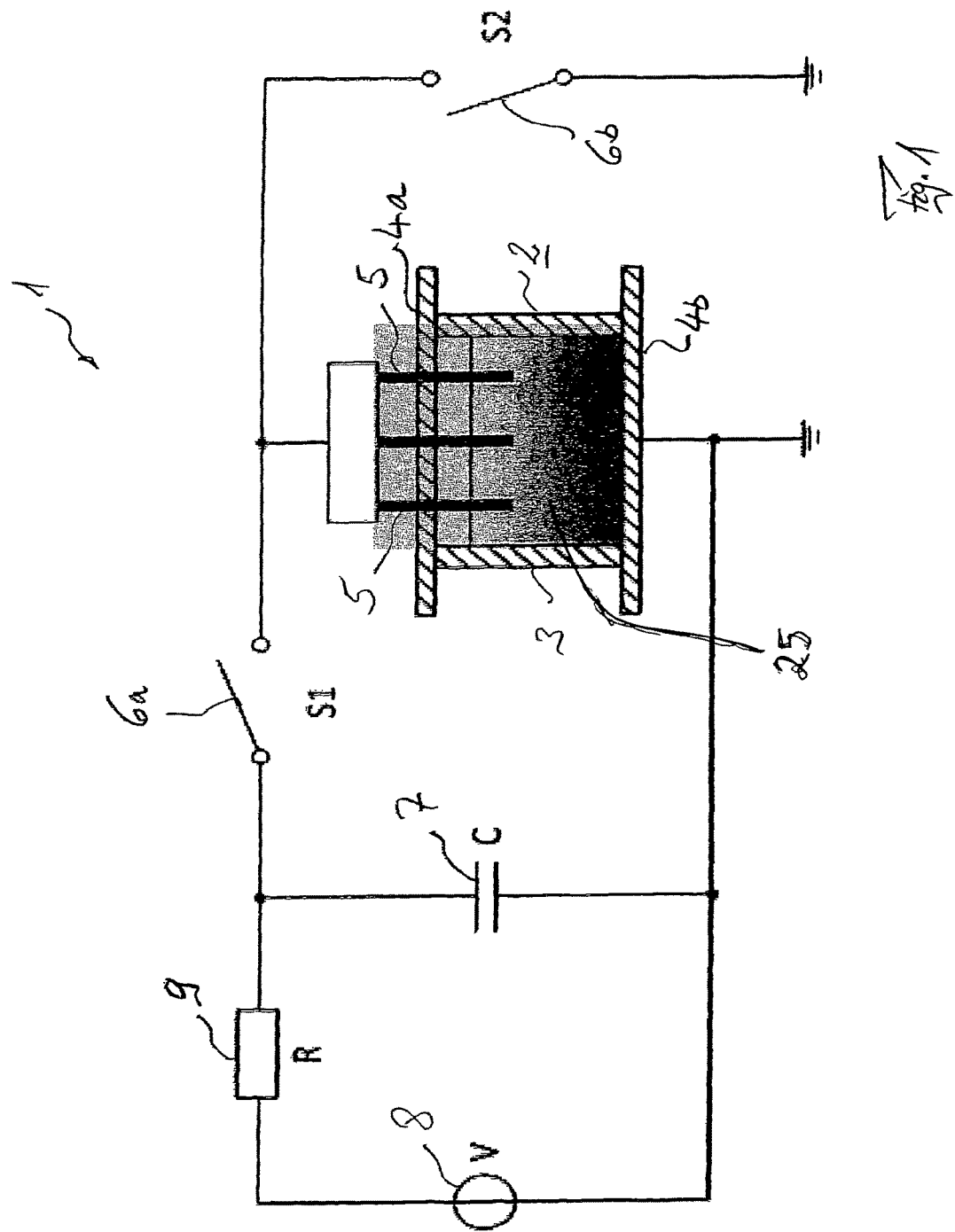

(58) Field of Classification Search
USPC .................................................. 241/1, 301
See application file for complete search history.

(56) References Cited

U.S. PATENT DOCUMENTS

| | | | |
|---|---|---|---|
| 2010/0025240 A1* | 2/2010 | Muller-Siebert | B02C 19/18 204/421 |
| 2012/0205472 A1* | 8/2012 | Bentaj | B02C 19/18 241/1 |

FOREIGN PATENT DOCUMENTS

| | | |
|---|---|---|
| DE | 10 2008 033122 A1 | 1/2010 |
| DE | 10 2009 034 314 B4 | 4/2011 |

OTHER PUBLICATIONS

DE102009034314A1 English Translation.*
International Search Report (in German with English translation) for PCT/EP2012/003913, dated Mar. 5, 2013; ISA/EP.
International Preliminary Report on Patentability with attached annexes (in German) for PCT/EP2012/003913; prepared Feb. 11, 2014; IPEA/EP.

* cited by examiner

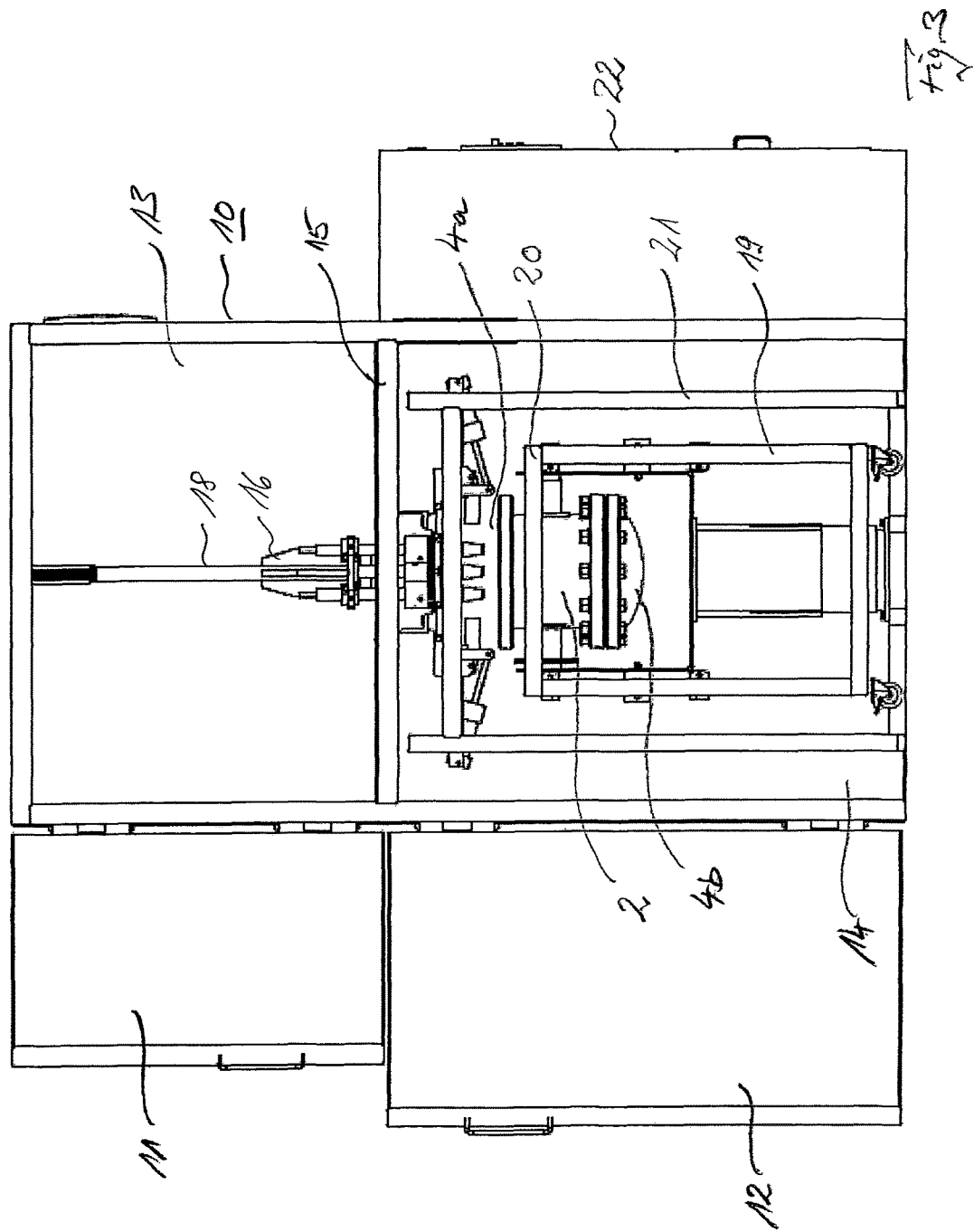

METHOD AND APPARATUS FOR DECOMPOSING A RECYCLATE

CROSS-REFERENCE TO RELATED APPLICATIONS

This application is a 371 U.S. National Stage of International Application No. PCT/EP2012/003913 filed on Sep. 20, 2012, which claims priority to German Patent Application No. 10 2011 116 921.4, filed on Oct. 26, 2011, the disclosures of which are herein incorporated by reference in their entirety.

The invention relates to a method and an apparatus for the material-selective decomposition of a recyclate into reusable materials by means of the electrohydraulic effect.

DE 10 2006 027 273 B3 and DE 10 2008 033 122 A1 disclose using the so-called electrohydraulic effect (comminution effect) in order to comminute (electrohydraulically) a feed material in a water-filled comminution chamber with the aid of electrical flashovers to form a ground material. Specifically, the recovery of ultra-high-purity silicon from metallurgical-grade silicon by means of the electrohydraulic comminution effect is described in said documents.

DE 10 2009 034 314 B4 discloses a method for the material-selective decomposition of a fuel cell stack for the purpose of recycling with the aid of the electrohydraulic effect, in which method, in a first step, sound waves or shock waves impinging laterally on the adhesive areas of bipolar plates of the fuel cell stack are generated in a targeted manner by means of an electrode system, with the consequence that the integrity of the adhesive bonding is destroyed and as a result the main components of the fuel cell stack in the form of its bipolar plates are separated. In a further step, surface cleaning of the individual bipolar plates is performed.

This two-stage decomposition and cleaning method is geared specifically to the material-selective decomposition of fuel cell stacks and is neither intended nor suitable for the decomposition of other recyclates, especially since the pulse energy introduced is very low, with a maximum of 10 J, and the operating frequency or repetition rate of the high-voltage pulses generated is very high, at approximately 100 Hz.

DE 195 34 232 A1 discloses a method for comminuting and crushing solids conglomerated from nonmetallic or partially metallic component parts and for decomposing homogeneous nonmetallic solids by discharge of an electrical energy store as quickly as possible, which method is intended to also be usable for breaking apart metal-plastics bonds or plastics-ceramic bonds or a composite comprising metal, ceramics and plastics. This known method is intended to ensure, by virtue of the dimensions provided for an LC discharge circuit, that the voltage increase takes place up to the breakdown voltage below a delay time of 200 ns and the electrical flashovers are generated substantially in the solid to be decomposed, namely in the material to be ground.

The invention is based on the object of specifying a particularly suitable method for decomposing a recyclate composed of a plurality of workpieces or component parts into reusable materials. Furthermore, the invention is intended to specify an apparatus suitable for this. In particular, it should be possible to select a maximum possible number of different items, parts or materials as completely as possible in a simple and cost-saving manner.

In respect of the method, this object is achieved according to the invention by the features of claim 1. Advantageous developments and variants are the subject matter of the dependent claims referring back to said claim.

In this regard, a pulse discharge with an average field strength of less than or equal to 5 kV/mm and a pulse or discharge energy of greater than 10 J, preferably between 300 J and 1200 J, is generated at least substantially in the liquid by means of a pulse current source within an underwater spark gap. In this case, the recyclate is positioned in the container in such a way that it rests on the container-base side and at least partially fills the underwater spark gap.

Preferably, in the method according to the invention, a pulse duration of greater than 1 μs at a pulse rise time of the or each high-voltage pulse of greater than 500 ns is set, with the result that the discharge channels form substantially in the liquid in the container.

The invention is based on the consideration that the formation of electrical flashovers in the solid to be decomposed (material to be ground) is dependent on the physical properties, in particular on the dielectric strength, of the substances involved, and that the liquid into which the solid to be decomposed is introduced and the solid itself have a different response in terms of dielectric strength over time. For voltages which are present for a short period of time, liquids, such as water, for example, have a much higher dielectric strength than solids (material to be ground).

If, accordingly, a voltage is present for relatively long time periods, the curve of the breakdown voltage of the water falls below that of the solid or the material to be ground. This means that, for a targeted generation of flashovers in the solid, voltage pulses with particularly steep edges are required in order to make it possible for the liquid to have a comparatively high dielectric strength. In order to achieve such high rates of voltage rise, a sufficiently high driving force in the form of an applied high voltage of 300 kV to 600 kV is required. Owing to a plurality of capacitors which are connected in parallel in a capacitor bank, a correspondingly high voltage can be generated, wherein, in the event of discharge, the capacitors are connected in series (Marx generator). However, such a capacitor bank is very involved.

Also, the method known from DE 195 34 232 A1 mentioned at the outset is also characterized by such a high pulse voltage of 300 kV to 600 kV and a comparatively low energy per individual pulse and the targeted generation of the electrical flashover in the solid (material to be ground). The last-mentioned substantive matter effects the formation of the shockwave in the body of the material to be comminuted. At the point of origin of said shockwave, very high pressure gradients occur, which can result in a local concentration of compression breakages in the direct vicinity of the origin of the shockwave. In the event of a spherical propagation of this compression wave in the material to be ground, furthermore transmission and reflection effects occur at transitions between adjacent materials. These effects of the pulse wave physics result in a significant increase in the pressure gradients at the material interfaces and therefore in mechanical breakages preferably at these points.

The invention is now based on the knowledge that a recyclate can be decomposed reliably in a material-selective manner when a number of high-voltage pulses with a pulse rise time at which the breakdown voltage of the liquid medium is reached temporally significantly prior to that of a dielectric material to be selected are generated within a predetermined, relatively low repetition rate.

Precisely in the case of such pulse rise times at which the breakdown voltage of the liquid medium is reached temporally prior to that of the materials to be selected, a multiplicity of different recyclates can be decomposed with comparatively little complexity and in particular at a comparatively lower high voltage of less than 100 kV in a material-selective manner into the usable component parts or workpieces of said recyclates.

This knowledge can be attributed to the physical consideration that, in the case of the generation of shockwaves or power sound waves in the liquid medium, a large-area wave input into a material or into the material to be ground thereof which is immersed, i.e. inserted or submerged into a liquid medium, takes place, as a result of which different selection effects or processes and accordingly material-selective disintegrations of the workpieces contained in the respective recyclate can be realized. The processes occurring can be subdivided into the physical procedures described below.

As a result of the homogeneous, isotropic energy input from the liquid medium, the immersed material undergoes a likewise homogeneous force input. The comminution method thus has a high degree of breakage selectivity in respect of differences in the mechanical strength in the material. In contrast to all conventional comminution variants, the preferred breakage at the force input point, which in all other variants is provided in locally concentrated fashion, is dispensed with.

After the entry of the shockwave or power sound wave into the material, the wave propagates through the solid and, at each material inhomogeneity located in the propagation path, which also represents an inhomogeneity of acoustic impedance, experiences a reflection, whose intensity or strength is dependent on the ratio of the acoustic impedances of the two interface materials.

In the event of a reflection at the fixed end, a reflection with a phase invasion which brings about a tensile stress between the two media takes place at such a transition. As a result of this physical phenomenon, also referred to as the Hopkins effect, the formation of fractures is additionally intensified. As a result, the respective material breaks in a targeted manner at the mechanically unstable points.

Owing to the partial conductivity of the composite materials to be recycled, current is passed in a targeted manner along conductive regions, which experience a correspondingly higher energy input. Given a correspondingly small cross section, an explosion-like thermal energy conversion also takes place here, as a result of which a shockwave is likewise generated. In physical experiments, this partial effect is known under the designation "wire explosion". Particularly high energy inputs result in this connection at the transition between conductive regions of the material and the liquid (so-called "roots") or the rest of the dielectric solid.

A particular feature of the electrohydraulic effect during recycling of composite materials, as is known, therefore consists in that the abovementioned effects occur in combination and therefore a high degree of selectivity of the breaking-apart can be achieved, depending on the elemental mixture.

In respect of the apparatus, the mentioned object is achieved according to the invention by the features of claim 10. Advantageous configurations and variants are the subject matter of the dependent claims which refer back to said claim.

The apparatus comprises a container which can be filled with a liquid for accommodating the recyclate and means for generating electrical pulse discharges in the liquid. An electrode system to which a high voltage can be applied and comprising at least one electrode and one mating electrode is provided and designed to generate a number of high-voltage pulses within a predeterminable repetition rate in such a way that, within an underwater spark gap between an electrode on the container-base side and at least one electrode which is on the container-cover side and points towards said electrode, a pulse discharge with an average high voltage or field strength less than or equal to 5 kV/mm and a pulse or discharge energy of greater than 10 J, preferably between 300 J and 1200 J, is generated, wherein the rise time of the high-voltage pulses is greater than 500 ns, in particular greater than 1 µs. For efficient shockwave generation, the pulse duration should likewise be less than 30 µs.

The method according to the invention and the apparatus according to the invention are suitable, for example, for recycling rechargeable batteries, in particular lithium-ion rechargeable batteries. For this purpose, the rechargeable battery is introduced into the container, also referred to below as recycling reactor, which is filled with the liquid medium, preferably with oil. Then, the positioning of the high-voltage electrode, preferably directly above the recyclate, is performed before electrical pulses are generated by means of the respective high-voltage electrode in a suitable manner by means of a pulse generator. The sound waves or shockwaves generated by the electrode system, which expediently comprises a plurality of electrodes, impinge on the rechargeable battery and destroy its outer sheath, which generally consists of plastics.

The further-processing by means of the electrohydraulic effect in accordance with the method according to the invention causes the metal housing of the rechargeable battery to rip open and the inner component parts to be decomposed, such as, for example, the electrodes of the rechargeable battery. If in this case an oil is preferably used as liquid medium instead of water, owing to this anhydrous mode of operation, the contact of the electrolyte of the rechargeable battery with water is avoided and thus a reaction resulting in a fire or in an explosion is reliably suppressed.

After the decomposition of the rechargeable battery, the individual component parts can be removed from the liquid medium, for example by means of sieving or hydrocyclonic separation. The substances contained in the grinding liquid as a result of the decomposition or the disintegration can be separated chemically.

It is also possible to implement a two-stage decomposition process. In this case, in a first stage, the plastics sheath of the rechargeable battery is detached and the metal housing of said rechargeable battery is opened, including passivation of the electrolyte in the anhydrous medium. In a second step, the material-selective separation of the housing and the electrodes of the rechargeable battery can be performed.

In order to break apart rechargeable batteries in various liquid media, the reactor container can also be conical. However, a cylindrical reactor container is preferred. The container or reactor size should be dimensioned such that a volume of less than or equal to 300 l, preferably between 2 l and 20 l, is provided. In this case, the high voltage should be between 20 kV and 100 kV, preferably in the range between 30 kV and 50 kV. The energy provided at the respective electrode of the electrode system should be between 100 J and 5000 J, in particular between 300 J and 500 J.

Preferably, the electrode system has more than one and fewer than ten electrodes, in particular up to three electrodes. The repetition rate of the high-voltage pulses, which are provided in particular by a pulse generator, is less than or equal to 100 Hz. Possible liquid media are in particular oil, but also tap water or distilled water, expediently including chemical additives.

When using oil as liquid medium, it is ensured that hazardous substances are located in the oil and in particular passivation of the fluorine is ensured, with the result that no hydrofluoric acid is produced and hydrogen formation as a result of a reaction of lithium and water is avoided.

In a specific exemplary embodiment, to start with a completely discharged lithium-ion rechargeable battery is introduced, as flat as possible, into the reactor container, which is filled with oil, for example with vegetable oil. Then, the reactor container is sealed with a container cover, in which the electrode system is integrated in a suitable manner. In this case, the electrode system preferably comprises a plurality of high-voltage electrodes, which, in a suitable manner, are arranged in the form of a circle. Such a multielectrode system enables a surface treatment over the entire reactor cross section. In order to avoid a pressure buildup in the container during the processing, a vent connection is provided in the container cover.

In the next step, the electrode gap, i.e. the gap between the respective high-voltage electrodes and the upper side of the rechargeable battery, is set. In this case, the electrode system is expediently positioned directly on the rechargeable battery.

In the following step, pulse discharges with a repetition rate of approximately 5 Hz to 10 Hz are generated by the pulse generator with an energy of in each case approximately 600 J at a voltage level of 40 kV at each electrode pair (i.e. one of the electrodes of the electrode system and the mating electrode, which is preferably common to all electrodes, at the container base). The increase in the repetition rate makes it possible to shorten the processing duration required.

A pressure wave, which arises temporally after the first flashover between the high-voltage electrodes and the metallic housing of the rechargeable battery, propagates in the oil, which results in comminution of the rechargeable battery. The processing time for the decomposition of the rechargeable battery in this case varies depending on the repetition rate, on the number and on the design and size of the rechargeable batteries introduced and is between 40 s and 200 s, for example.

After the processing according to the invention, the individual fractions are present in the liquid medium (grinding water) and can be separated mechanically and/or chemically.

The method according to the invention also enables the recycling of laminated metal foils. This method is performed in a reactor container which preferably consists of steel. The laminated foils are introduced into the reactor container together with the liquid medium, preferably tap water. Then, the reactor container is sealed with its reactor cover, in which the electrode system is again integrated. In this case, too, the electrode system preferably comprises a plurality of high-voltage electrodes arranged in the form of a circle with the aim of implementing processing over as large an area as possible over the entire reactor cross section. Again the reactor cover is also provided with a vent connection in order to avoid a pressure buildup within the reactor container as a result of the processing.

Likewise, the electrode gap between the high-voltage electrode and the mating electrode, which is embodied as grounding electrode and is provided on the container base or is formed thereby, is then set. Again pulse discharges with a repetition rate of approximately 3 Hz to 8 Hz and a pulse energy of between 100 J and 5000 J, in particular 300 J and 1500 J, per electrode and a high voltage of from 20 kV to 100 kV, in particular 30 kV to 50 kV, are generated by means of the pulse generator at or with each electrode pair. An increase in the repetition rate again enables the reduction in the required processing time.

The pressure wave arising after the electrical flashover between the high-voltage electrodes and the metal foil propagates in the water and results in the comminution and detachment of the coating. The required processing time again varies depending on the repetition rate and the filling quantity of the laminated foil introduced and is between 1 minute and 15 minutes, for example.

After the processing, separation of the foil and the coating on the basis of the size of the ground material can be performed, for example by means of sieving. The coating sediments in the grinding water of the reactor container as a very fine fraction (slurry) and can then be separated mechanically or chemically.

The method according to the invention and the apparatus according to the invention advantageously also enable the decomposition of electronic waste by means of the described electrohydraulic effect. Switches, in particular circuit breakers, contactors, ceramic components such as, for example, fuses or spark plugs, computer component parts, capacitors or the like and plugs or plug-type connections, can be decomposed, as recyclate, in particular also to give the reusable component parts thereof.

The shape of the reactor container can again be conical. Preferably, however, a cylindrical reactor container is used having a volume of again less than or equal to 300 l, in particular less than or equal to 40 l. The high voltage is again preferably less than 100 kV and in particular 30 kV to 50 kV. The energy per high-voltage electrode is also less than 5000 J and in particular less than 1500 J, but preferably more than 200 J per electrode in this recycling process. Again an electrode system comprising a plurality of electrodes arranged, in a suitable manner, in the form of a circle, preferably up to ten electrodes, is also used. A suitable liquid medium is tap water or distilled water, preferably including additives.

The fractionation and therefore the selection of the materials of the reusable workpieces contained in the electronic waste is performed on the basis of the different breakage characteristics of said workpieces in the plastics-ceramic and metal component parts or particles.

The method according to the invention and the apparatus according to the invention are in particular also suitable for the recycling of (electrical or electronic) printed circuit boards (circuit boards) in liquid media with or without additives. The feed to the reactor container is performed using comminuted printed circuit boards or else printed circuit boards retained in a compact form, depending on whether the printed circuit boards themselves are intended to be destroyed or not. The reactor shape can again be conical, but is preferably cylindrical.

The reactor volume should likewise fall below 300 l and can again be in particular 40 l. The high voltage should be between 20 kV and 100 kV, in particular between 30 kV and 50 kV. The electrode-specific energy should again be less than 5000 J and preferably between 200 J and 1200 J, wherein again an individual electrode, but preferably a plurality of electrodes, is/are advantageous, which electrode(s) is/are again arranged in a suitable manner in the form of a circle. The maximum electrode number should likewise not exceed ten electrodes. The repetition rate should also be less than or equal to 100 Hz.

An apparatus which is particularly suitable for implementing the method comprises a stationary supporting framework for the container cover and a mobile supporting framework for the coverless container or container body including the container base with the integrated mating electrode. The container body is preferably cylindrical, which enables the provision of a simple and cost-saving recycling reactor. In a known manner, an insulation-free steel or stainless steel tube can be used as container body with a flange attached to the base. A flange attached to the container body additionally on the cover side makes it possible, again in a particularly cost-saving manner, to attach the preferably dome-shaped container base including the mating electrode, on the one hand, and the separated container cover that can be positioned, on the other hand, by means of sealing screw-type flange connections, for example.

In a suitable manner, the stationary reactor framework is provided on the supporting side with a crossbar, which holds the container cover including the electrode system in a defined manner. In the coupled state, the container body is fixed on the container cover. The container body can in this case also be arranged pivotably in the mobile framework or the crossbar thereof, in particular for simplified filling or emptying of said container body.

The recycling apparatus additionally comprises, in a suitable manner, a cabinet-like housing, in particular also for providing a soundproof cabin, preferably having two housing chambers. A lower housing chamber accommodates the mobile supporting framework with the container body, while the stationary framework is positioned in the reactor housing. In this case, a further housing chamber located above the lower housing chamber accommodates the electrical engineering components, in particular the individual high-voltage capacitor or a small number of high-voltage capacitors and the connecting lines to the electrode system.

This recycling apparatus is additionally designed to position, in a vertically adjustable manner, the container cover on the reactor body, which has been pushed into the reactor housing or into the reactor cabinet by means of the mobile supporting framework, while in this case the high-voltage connections and further high-voltage components and/or possibly further electrical engineering components are positioned in the upper housing chamber. As a result, when the container cover is positioned on and fastened to the container body, the required operations are not impaired in a disadvantageous manner and parts conducting a high voltage are separated from the lower framework or container region.

One or preferably two housing doors enable selective closing of the upper and lower housing chambers of the reactor housing, for the purpose of soundproofing or ensuring electromagnetic compatibility (EMC) and for handling the reactor container or its body in a manner with protection against electric shock.

A control switchgear cabinet, which is positioned preferably physically directly next to the reactor housing, in a suitable manner to the side of the reactor housing, for the components for control of the assembly, said control switchgear cabinet comprising an again preferably columnar panel housing including control panel and display device, is used for operating, switching and controlling the recycling apparatus.

Figure 2:
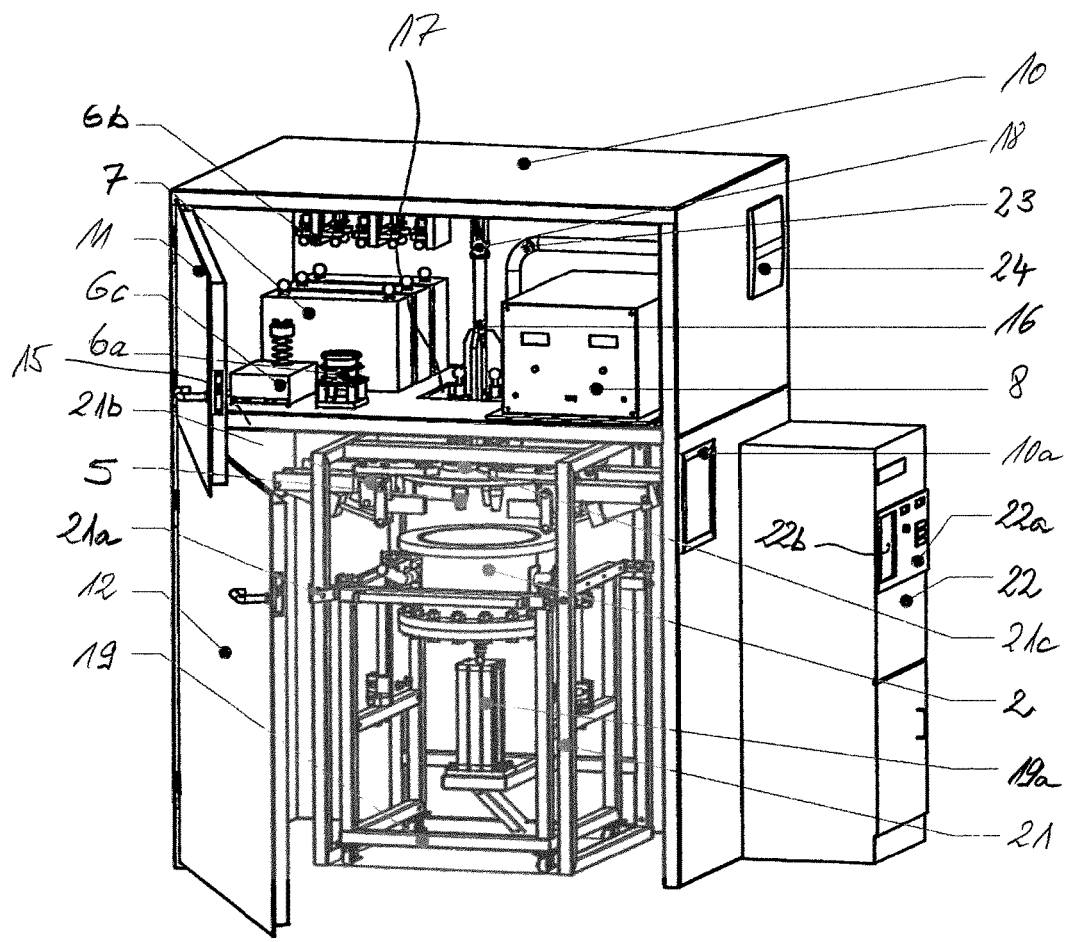

Exemplary embodiments of the invention will be explained below with reference to a drawing, in which:

FIG. 1 shows, in a simplified circuit diagram, an apparatus for the material-selective decomposition of a recyclate comprising a reactor container for accommodating a recyclate with electrodes on the cover side, FIG. 2 shows, in a perspective front view, a reactor container in a partially mobile reactor framework within a reactor housing comprising two housing chambers, and FIG. 3 shows the reactor housing and the mobile supporting framework with the reactor container in a front view.

FIG. 1 shows, schematically, at least the main components of an apparatus 1 for the material-selective decomposition of a recyclate into reusable materials comprising a container 2, filled with a liquid F, for accommodating the recyclate. The container 2 illustrated has, in a particularly simple embodiment, a cylindrical container body 3, for example consisting of stainless steel, comprising a cover-side (upper) flange and a base-side (lower) flange as well as a container cover 4a and a container base 4b. In this case, three rod-shaped electrodes 5 are inserted or integrated in the container cover 4a, preferably equidistantly with respect to one another. The electrodes 5 have a vertical extent, i.e. substantially parallel to the cylindrical wall of the container body 3. The container cover 4a and the container base 4b are connected in sealing fashion and detachably to the corresponding flanges of the container body 3 by means of a multiplicity of screw connections distributed uniformly over the circumference.

The container base 4b forms the mating electrode or contains said mating electrode and can be connected to ground potential, in a manner which is not illustrated in any more detail. The arrangement of the electrodes 5 of the electrode system formed thereby are arranged distributed as uniformly as possible over the container cover 4a and therefore over the container area. It is also possible for, for example, up to ten electrodes 5 to be arranged distributed uniformly over the container area. The container body 3 is preferably embodied without any inner wall insulation. Such inner wall insulation is not required for implementing the method according to the invention.

The electrodes 5 are connected to a capacitor 7 (C) via a high-voltage switch 6a (S1) and a safety switch disconnector 6b (S2) connected to ground or ground potential. In this case, in a suitable manner, in each case one safety switch disconnector 6b and in each case one capacitor 7 is provided for each of the electrodes 5. The or each capacitor 7 is charged by means of a charger 8 (V), in particular via an ohmic resistor 9 (R).

FIGS. 2 and 3 show the apparatus 1 embodied as a recycling reactor comprising a reactor housing 10 having doors 11 and 12 articulated on one side of said reactor housing. The reactor housing 10 has two chambers 13 and 14, which are divided or separated from one another by means of a partially perforated intermediate base 15. The upper chamber 13 acts as component space for accommodating electrical components and a fan, for example. An adjustment unit 16 for making contact with the electrodes 5 arranged in the lower chamber 14, acting as working space, leads on one side via an aperture 17 (through-opening) in the intermediate base 15 of the housing 10 into the working space 14 and, on the other side, is connected in the component space 13 to an adjustment cylinder 18 for electrode adjustment.

The reactor body 2 with a container base 4b which is dome-like in this embodiment, which container base in turn forms the mating electrode, is held in a mobile supporting framework 19 on an upper crossbar 20 (FIG. 3). A stationary supporting framework 21, beneath which the mobile supporting framework 19 is movable, supports the container cover 4a. A guide rail 21a is used for positioning the mobile supporting framework or reactor framework 19 on or in relation to the stationary supporting framework 21. A lifting cylinder 19a, which is provided, in a suitable manner, centrally in the mobile supporting framework 19, is used for lifting the reactor body 2 in the direction of and on the container cover 4a, while a tensioning system 21b is used for fastening the reactor body 2 to the container cover 4a. In order to fix the electrodes 5, a holder 21c on the stationary supporting framework 21 is used.

In the fitted state, in this configuration the container cover 4a is screwed to the container body 3. A tower-like control switchgear cabinet 22 arranged outside the reactor housing 10 and having a control panel 22a and display device 22b makes it possible to bring the reactor container 1 into operation and control said reactor container for the purpose of decomposing different recyclates. In the region of the lower chamber 14 used as working space, a viewing window 10a for a visual inspection is provided in the reactor housing 10.

As merely illustrated in FIG. 2, the safety-relevant components, namely the adjustment unit 16 for making contact with the electrodes 5, the adjustment cylinder 18 for the electrode adjustment, the high-voltage switch 6a and the triggering block 6c thereof, the safety switch disconnector 6b, the or each capacitor 7 and the charger 8, are arranged in the upper chamber 13 of the reactor housing 10, while the components used for manual operation, in particular the supporting frameworks 19 and 21 and the reactor container 1 including the container body 3, the container cover 4a and the container base 4b are arranged in the lower chamber 14 of the reactor housing 10. In addition, a fan tube 23 of a fan 24 connected to the exterior is located in the upper chamber 13 of the reactor container 1, said fan tube leading into the lower chamber 14.

In order to fill or charge the reactor container 1 with a liquid medium, preferably water, and the recyclate to be decomposed, the container body 2 is movable out of the lower working space 15 by means of the mobile framework 19 when the container cover 4b is removed and supported by the stationary framework 21. The reactor body 2 filled with the liquid medium, into which reactor body the recyclate to be decomposed has been introduced, is then moved into the working space 15 and positioned there beneath the stationary framework 19 in such a way that the container cover 5 can be positioned on the container body 2 and screwed thereto. Then, the working space 15 can be sealed already by means of the housing door 13, while further connection and preparatory measures can continue to be performed in the upper housing chamber 14. Then, the upper housing chamber 14 is also closed by means of the housing door 12. As a result, soundproofing and in particular sufficient EMC protection are ensured.

The reactor or recycling container 1 can be brought into operation for implementing the method according to the invention by means of the control panel 22, whilst ensuring the required safety. A pulse generator, which is integrated, for example, in the control panel 22 or in the upper housing chamber 14, is connected to a corresponding energy source, in particular to a power grid with approximately 360 V to 400 V, and is supplied thereby. The high-voltage pulses are preferably generated thereby by means of only a single high-voltage capacitor, in a controlled manner and with a repetition rate of less than or equal to 10 Hz. The generated high voltage is less than or equal to 100 kV, preferably approximately 50 kV. In this case, a pulse-specific discharge energy of between 300 J and 1200 J is generated for generating pulse discharges with an average field strength within an underwater spark gap 25 (see FIG. 1) of less than or equal to 5 kV/mm in the reactor container 2.

The recyclate introduced into the liquid medium is decomposed in a material-selective manner by means of the pulse discharges, wherein a number of high-voltage pulses with a pulse rise time at which the breakdown voltage of the liquid medium is achieved temporally largely prior to that of the dielectric materials to be selected are generated within a predetermined repetition rate.

As a result, implicitly a generation of the shockwave within the liquid medium is achieved. In contrast, in known methods, for example in accordance with DE 19 534 232 A1, on the basis of the technical boundary conditions, explicitly a flashover is brought about by the solid.

If, however, corresponding to the method according to the invention, a shockwave is generated in the liquid medium, a different physical main effect mechanism results. The comminution of the material results primarily from the coupling-in of the shockwave from the liquid medium into the material of the recyclate (material to be ground). As a result of the homogeneous, isotropic energy input from the liquid medium, the immersed material to be ground undergoes a likewise homogeneous force input. The comminution process thus has a high degree of fracture selectivity as a result of differences in mechanical strength in the material. In contrast to other comminution variants, the preferred breakage at the force input point, which is provided in locally concentrated fashion in the known method, is dispensed with.

The electrohydraulic method therefore advantageously represents the possibility of separating composite materials as a result of extremely small differences in strength within said composite materials. This enables an advance in terms of quality in the separation of composite materials. Furthermore, it enables a simpler design in terms of apparatus since the design of complicated Marx generators is dispensed with. Thus, the problem of insulating the high voltages of above 100 kV arising is also no longer relevant. The latter brings about a qualitatively different procedure than at lower voltages, in particular 50 kV, since above these voltages corona discharges occur, which need to be shielded in a complex manner.

Furthermore, owing to the relatively low voltages, it is possible to use air insulation within the generator, with the result that there is no longer a need to use oil insulation as in the case of the abovementioned Marx generators. The relatively low assembly costs resulting eliminate the previously critical constraint in respect of the application of pulse technology in recycling, namely the high investment costs and the often resultant lack of profitability of the application.

Furthermore, other selection effects also occur in addition to the abovementioned fractionation owing to mechanical instabilities. For example, after entry of the shockwave or power sound wave into the respective material or the materials of the recyclate, also referred to as material to be ground below, the wave propagates through the solid and, at each material inhomogeneity located in the propagation path, which also represents an inhomogeneity of the acoustic impedance, undergoes a reflection whose intensity or strength is dependent on the ratio of the acoustic impedances of the two interface materials. In the case of a reflection at the fixed end, a reflection with a phase invasion takes place at such a transition, which reflection brings about a tensile stress between the two media. As a result of this physical phenomenon, which is also referred to as the Hopkins effect, the formation of breakages is additionally intensified. As a result, the respective material breaks in a targeted manner at the mechanically unstable points.

As a result of the partial conductivity of the composite materials to be recycled, current is passed in a targeted manner along conductive regions, which undergo a correspondingly increased energy input. Given a correspondingly small cross section, this also results in an explosion-like thermal energy conversion, as a result of which a shockwave is likewise generated. In physical experiments, this partial effect is known by the term "wire explosion". Particularly high levels of energy input result in this connection at the transition between conductive regions of the material to be ground and the liquid (so-called "roots") or the remaining dielectric solid.

A particular feature of the electrohydraulic effect during recycling of composite materials can be considered to be that the abovementioned effects occur in combination and a high degree of selectivity of the breaking-apart can therefore be achieved depending on the elemental mixture.

LIST OF REFERENCE SYMBOLS

1 Apparatus/recycling reactor
2 Container
3 Container body
3a Upper flange
3b Lower flange
4a Container cover
4b Container base/mating electrode
5 Electrode
6a High-voltage switch S1
6b Safety switch disconnector S2
6c Triggering block
7 Capacitor C
8 Charger V
9 Resistor R
10 Reactor housing
10a Viewing window
11 (Upper) door
12 (Lower) door
13 Chamber/component space
14 Chamber/working space
15 Intermediate base
16 Adjustment unit
17 Aperture/through-opening
18 Adjustment cylinder
19 Mobile supporting framework
19a Lifting cylinder
20 Crossbar
21 Stationary supporting framework
21a Guide rail
21b Tensioning systems
21c Holder
22 Control switchgear cabinet
22a Control panel
22b Display
23 Fan tube
24 Fan
F Liquid

The invention claimed is:

1. A method for the material-selective decomposition of a recyclate composed of a plurality of workpieces or component parts into reusable materials by means of an electrohydraulic effect, the method comprising:
generating, in a container filled with a liquid, a pulse discharge with an average field strength of less than or equal to 5 kV/mm in the liquid by a pulse generator within an underwater spark gap between an electrode integrated in a container bottom of the container and a plurality of electrodes on a container cover of the container, the plurality of electrodes on the container cover pointing towards the electrode of the container bottom, and a pulse or discharge energy within a range from 300 J to less than 1000 J is generated in the liquid by means of each electrode of the plurality of electrodes on the container cover, wherein the recyclate is enclosed partially in the underwater spark gap in the container; and
setting a repetition rate of high-voltage pulses to a value of less than or equal to 10 Hz, wherein, within the repetition rate, the high-voltage pulses are generated with such a pulse rise time that a breakdown voltage of the liquid is largely reached prior to that of dielectric materials to be selected.

2. The method as claimed in claim 1, wherein a pulse duration of greater than 1 μs is set for each of the high-voltage pulses having a pulse rise time that is greater than 500 ns.

3. The method as claimed in claim 1, wherein the method is for breaking apart rechargeable batteries, for detaching usable component parts from a laminated metal foil, for decomposing populated printed circuit boards or for decomposing electronic waste including circuit breakers, contactors or plug connectors, and/or parts provided with ceramic component parts including spark plugs or capacitors.

4. The method as claimed in claim 3, wherein the populated printed circuit boards together with metal foils, which are inserted between said printed circuit boards, are introduced into the filled container.

5. The method as claimed in claim 3, wherein the rechargeable batteries are lithium-ion rechargeable batteries.

6. An apparatus for implementing a method for the material-selective decomposition of a recyclate composed of a plurality of workpieces or component parts into reusable materials by means of an electrohydraulic effect, the apparatus comprising:
a container which can be filled with a liquid for accommodating the recyclate, the container having a container bottom and a container cover, a plurality of electrodes being provided on the container cover and an electrode being integrated in the container bottom, the plurality of electrodes provided on the container cover pointing towards the electrode of the container bottom; and
a pulse generator for generating electrical pulse discharges in the liquid, the pulse generator configured to generate a pulse discharge with an average field strength of less than or equal to 5 kV/mm within an underwater spark gap between the electrode of the container bottom and the plurality of electrodes provided on the container cover,
wherein the plurality of electrodes provided on the container cover generate, in the liquid, a pulse or discharge energy of between 300 J and less than 1000 J,
wherein a repetition rate of high-voltage pulses is set, by the pulse generator, to a value of less than or equal to 10 Hz.

7. The apparatus as claimed in claim 6, wherein the plurality of electrodes provided on the container cover comprises up to fifty electrodes.

8. The apparatus as claimed in claim 6, wherein the container is a cylindrical container.

9. The apparatus as claimed in claim 8, wherein the cylindrical container is free from wall insulation.

10. The apparatus as claimed in claim 6, wherein a volume of the container is less than or equal to 300 l.

11. The apparatus as claimed in claim 6, wherein the pulse generator includes high-voltage capacitors for generating a high voltage of less than or equal to 100 kV.

12. The apparatus as claimed in claim 6, wherein the pulse generator is provided to set a discharge energy of each of the high-voltage pulses of greater than 10 J.

13. The apparatus as claimed in claim 6, comprising a mobile reactor framework, which accommodates the container and is movable beneath a stationary reactor framework, which accommodates the container cover.

14. The apparatus as claimed in claim 13, comprising a reactor housing comprising a first lower housing chamber for accommodating the reactor framework and comprising a second upper housing chamber for accommodating the pulse generator.

15. The apparatus as claimed in claim 14, comprising a control and/or switchgear cabinet, which is connected to an exterior of the reactor housing and comprises a control panel for actuating the pulse generator.

16. The apparatus as claimed in claim 6, wherein the pulse generator includes high-voltage capacitors for generating a high voltage of between 30 kV and 50 kV.

17. The apparatus as claimed in claim 6, in which the pulse generator is provided to generate, with each electrode of the plurality of electrodes provided on the container cover, a discharge energy of 0.2 kJ to 1.5 kJ.

18. The apparatus as claimed in claim 6, wherein the pulse generator includes a single high-voltage capacitor for generating a high voltage of less than or equal to 100 kV.

\* \* \* \* \*